(12) United States Patent
Chang et al.

(10) Patent No.: US 8,094,472 B2
(45) Date of Patent: Jan. 10, 2012

(54) POWER FACTOR CORRECTION CONVERTER CAPABLE OF FAST ADJUSTING LOAD

(75) Inventors: Cheng-Ching Chang, Taichung (TW); Ming-Shi Huang, Taichung (TW); Yue-Huei Lei, Taichung (TW)

(73) Assignee: Rhymebus Corporation, Taichung (TW)

( * ) Notice: Subject to any disclaimer, the term of this patent is extended or adjusted under 35 U.S.C. 154(b) by 354 days.

(21) Appl. No.: 12/476,911

(22) Filed: Jun. 2, 2009

(65) Prior Publication Data

US 2010/0302818 A1 Dec. 2, 2010

(51) Int. Cl.
*H02M 3/335* (2006.01)
(52) U.S. Cl. .......................................................... 363/80
(58) Field of Classification Search .................... 363/80, 363/81, 89, 127
See application file for complete search history.

(56) References Cited

U.S. PATENT DOCUMENTS

| 6,181,583 B1 * | 1/2001 | Okui et al. ................. 363/89 |
| 6,912,136 B2 * | 6/2005 | Thrap ........................ 363/21.01 |

* cited by examiner

Primary Examiner — Jue Zhang
(74) Attorney, Agent, or Firm — Ming Chow; Sinorica, LLC (57) ABSTRACT

A power factor correction converter capable of fast adjusting load functions to (a) convert a single-phase AC voltage into a DC voltage output; (b) control an input current and an input voltage for a correspondent electrical phase, namely the power factor that is 1; and (c) control a DC output voltage level. The converter is provided with a booster-based AC-DC converter as a core, in which the circuit includes a rectification circuit, a switching circuit consisting of a DC inductor and a power crystal, an energy-saving capacitor, a protection circuit, a microprocessor, and auxiliary circuits around. The power factor control, output voltage, and current control and filter modules function in the form of software program instead of conventional hardware circuits. Further, a powerful controller uses an output current feedback to enhance the DC output voltage to suppress the disturbance of load.

16 Claims, 7 Drawing Sheets

POWER FACTOR CORRECTION CONVERTER CAPABLE OF FAST ADJUSTING LOAD

BACKGROUND OF THE INVENTION

1. Field of the Invention

This invention relates to a power factor correction converter capable of fast adjusting load.

2. Description of the Prior Art

Figure 1:
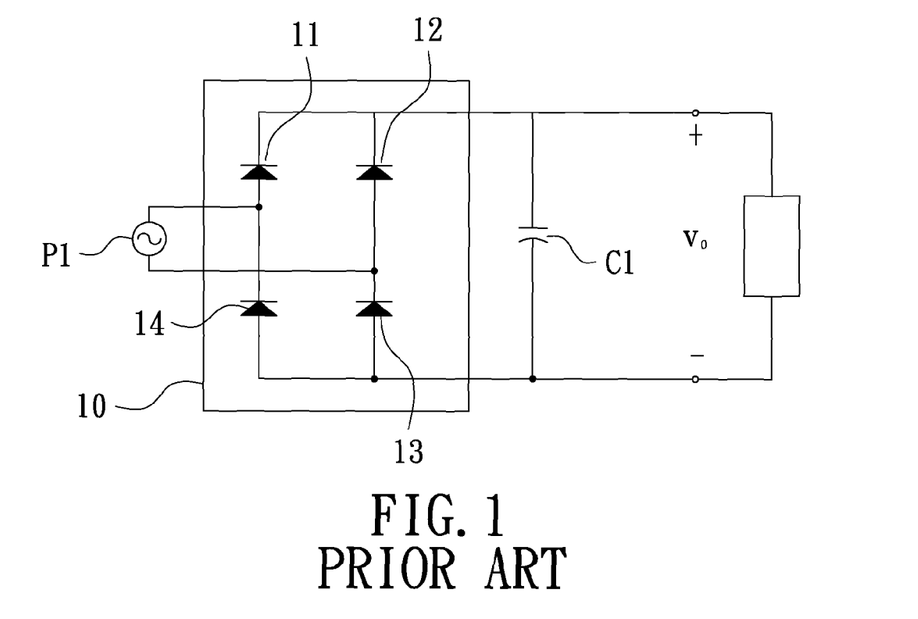
FIG. 1 is a schematic view illustrating a conventional single-phase rectification circuit.

With reference to FIG. 1 shown as a schematic view illustrating a conventional single-phase rectification circuit, a bridge rectification circuit 10 consists of four diodes 11, 12, 13, and 14 that are connected in parallel to an output capacitor C1. An AC power P1 is further connected across the bridge rectification circuit 10. When the AC power P1 is positive, the input current is transmitted through diodes 11 and 13; when the AC power P1 is negative, the input current is transmitted through diodes 12 and 14 and then filtered by the output capacitor C1, a DC power being thereby obtained. Although the structure of rectification circuit is advantageously simplified, the bridge rectification circuit 10 that charges the output capacitor C1 easily causes a very high surge current impacting other sets of electrical equipment.

Figure 2:
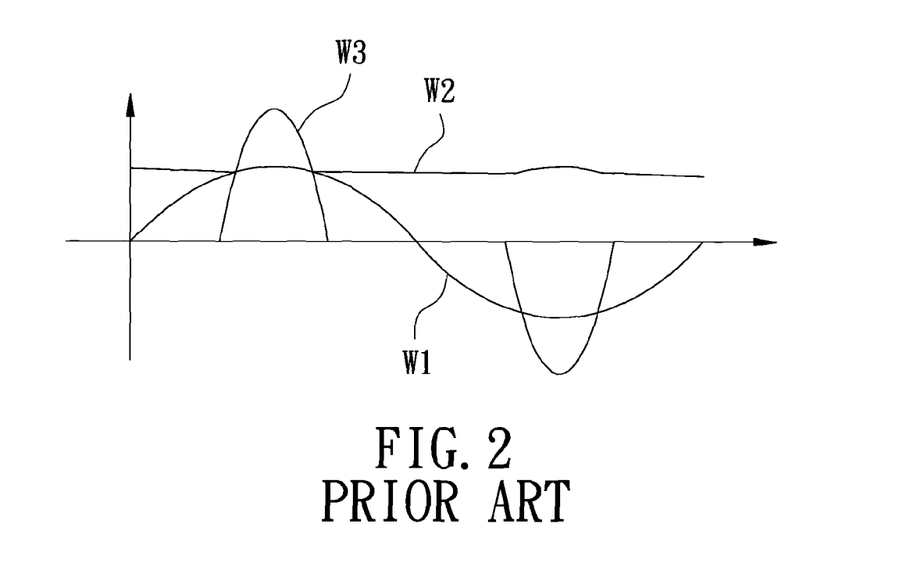
FIG. 2 is a view of an I/O voltage waveform generated from the single-phase rectification circuit shown in FIG. 1.

With cross reference to FIG. 2 shown as a view of an output voltage waveform generated from the single-phase rectification circuit in FIG. 1, when the input voltage waveform W1 generated from the AC power is a sine wave and the output power waveform W2 contains DC power, the surge current W3 generated from the input bridge rectification circuit 10 is not a sine wave; in addition to inferior power factor, the surge current makes the capacity of components and wiring circuit increase, the loss of power supply system thereby directly increasing and other users applying a power distribution system being thereby indirectly affected.

Owing to the poor effects derived from the conventional manners, in many prior arts, the technology of power factor amendment is used to improve the art. With different components, the technology of power factor amendment may be divided into passive and active power factor correction. The circuit of passive power factor correction is easily designed, in which a filtering circuit consists of an inductor and a capacitor (not shown) is added between the bridge rectification circuit 10 and an AC power P1 to moderate the surge current for enhancement of the power factor. However, in such a manner, the total harmonic distortion of input current is high, the physical volume is extremely high, and the power factor is not effectively improved.

In the aspect of active power factor correction, the circuit is more complicatedly designed and a switch component must be added in the circuit; further, in the electrical and electronic technology, an adequate control manner is applied to turn ON or OFF the active power switch, and thus the input power current is made to approach the sine wave and follow the input power voltage; the power factor may reach 0.97 or above and there are advantages of low physical volume, low weight, and low total current harmonic distortion.

Figure 3:
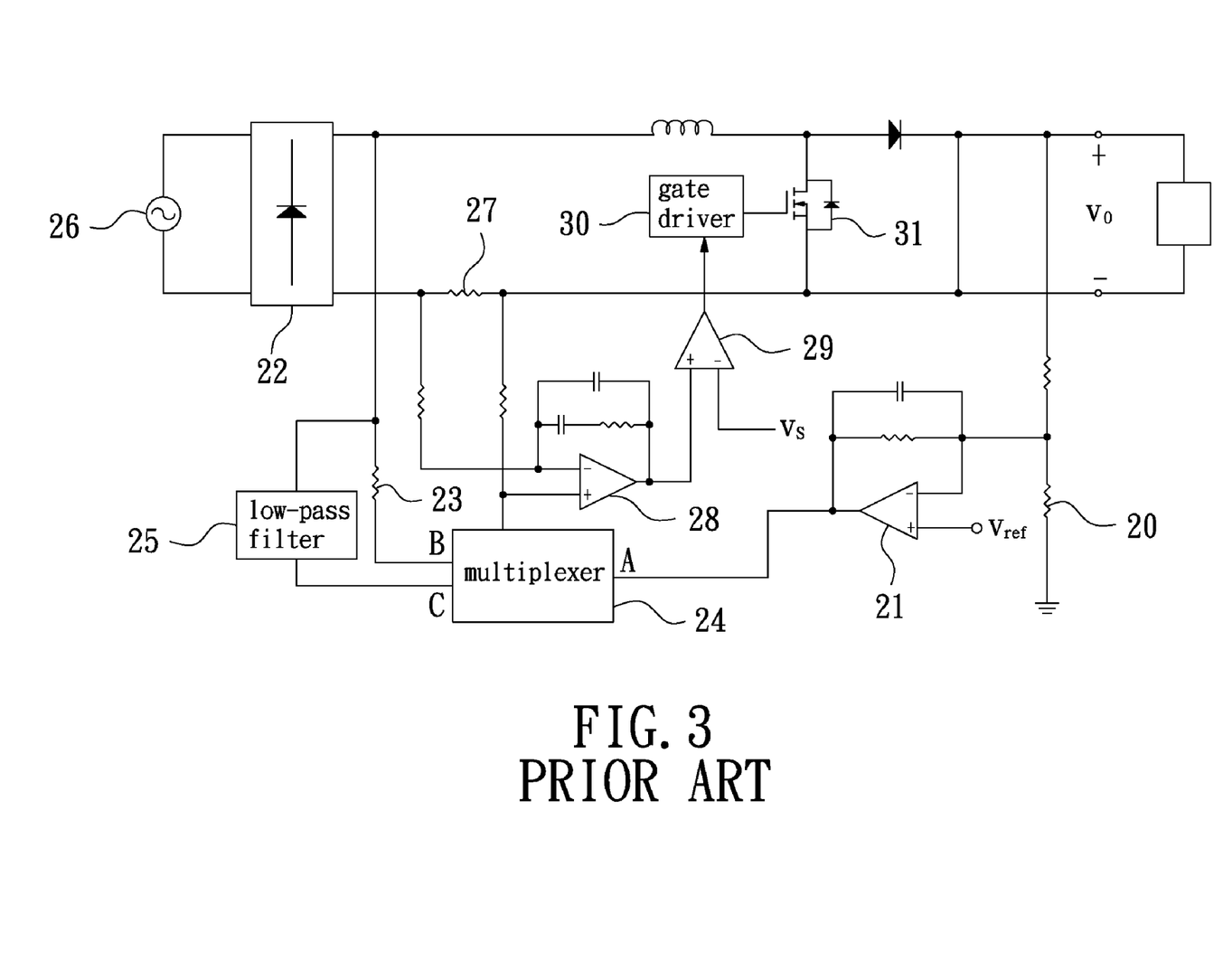
FIG. 3 is a schematic view illustrating a conventional control circuit provided with a single-phase active PFC specific IC (UCC3854)

With reference to FIG. 3 shown as a schematic view illustrating a conventional control circuit provided with a single-phase active PFC specific IC (UCC3854), a potential-divider resistor 20 is mainly used to obtain a DC output voltage feedback signal and, after the signal is compared by a voltage amplifier 21 with a DC voltage command $V_{ref}$, a voltage differential signal A is obtained; then after the signal is rectified by the diode-based bridge rectifier 22, an input voltage signal B is obtained by a resistor 23 and multiplied through a multiplexer 24. Thus, a sine current command co-phase with the input voltage, the amplitude of which is adjusted according to the variation of a load may be obtained. After square times of signal C transmitted through a low-pass filter 25 to the multiplexer 24 is obtained, the signal C is divided by the product of voltage differential signal A and the input voltage signal B; in such a manner, the gain of loop formed by the voltage amplifier 21 may be kept constant and the output is made to serve as a power control. Thus, the variation of input power 26 that is allowed by the system may increase. Next, the sine current command is compared with the feedback of a real input current in a current amplifier 28 and then a current differential compensation signal may be obtained. Further, the current differential compensation signal is compared with a sawtooth wave or a triangle wave $V_s$ in a Pulse Width Modulation (PWM) and then a pulse modulation signal is obtained; next, the signal is converted by a Gate Driver 30 into a drive signal for the active power switch 31 to control the amplitude of duty cycle of the power switch 31. When the real input current is higher than the sine current command, a negative value or a lower current differential compensation signal is obtained from the current amplifier 28 to reduce the duty cycle; otherwise, the duty cycle increases. Thus, the input current may follow the sine current command to vary for making the phase of current of the input power 26 corresponds to that of voltage of the input power 26 and thus increasing the power factor. However, there are many defects in the conventional correction circuit, such as what is described below.

(A) Being implemented with hardware, the structural control circuit is easily limited to the characteristics of all circuit components, and errors caused in a manufacturing process, so it is not easy to implement the control strategy.

Figure 4:
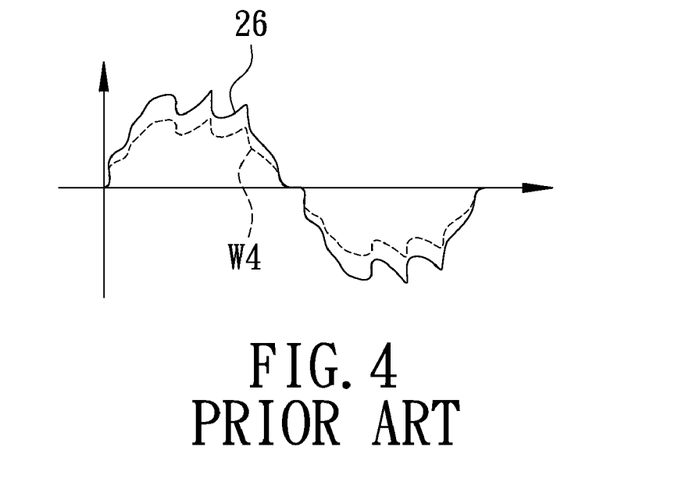
FIG. 4 is a view of a waveform generated when the input power voltage is a non-pure sine wave that is shown in FIG. 3.

(B) With reference to FIG. 4, because the sine current command is obtained according to the input voltage signal B detected by the resistor 23, when the voltage of input power 26 forms a non-pure sine wave, if the current command W4 is applied in this case, harmonic content is contained; thus, the current of real input power 26 and the identical harmonic content of input voltage cause the power factor to be impacted and generate high frequency harmonics of current of the input power 26 that turn worse the quality of power of the power supply system.

(C) Owing to the non-linear characteristic of rectification filtering, the conventional active power factor correction converter causes second harmonics of the power frequency of DC output voltage. In order to reduce the impact of second harmonics, a first-order RC low-pass filter the frequency of which ranges from 10 Hz to 20 Hz is generally added in the path of voltage feedback. Although, in this manner, the second harmonics in the feedback loop may be attenuated to keep stable the DC output voltage, the bandwidth is thus limited, the dynamic response of system being thereby poor. Consequently, when fast DC output voltage connection varies the load, the output voltage cannot be stable. The maximum output voltage overshoot and dip that are caused by the load variation significantly increases to indirectly turn worse the effect of improvement of the power factor and input current harmonics.

With cross-reference to US patent No. 2006245219, titled Digital Implementation of Power Factor Correction, a digital circuit is provided to implement a conventional active power factor correction converter, and it is disclosed that the feedback voltage is fed forward to a current loop command input terminal to enhance the dynamic response of output voltage.

With cross-reference to Taiwan Laid-Open patent No. 200423516, titled Power Supply Controller for a drive motor of a sports apparatus, a digital processor is used to implement a conventional active power factor correction converter, and it is closed that an input voltage waveform is read in the manner of table lookup to be a basis of modulation of an input current waveform.

Consequently, because of the technical defects of described above, the applicant keeps on carving unflaggingly through wholehearted experience and research to develop the present invention, which can effectively improve the defects described above.

SUMMARY OF THE INVENTION

A power factor correction converter capable of fast adjusting load according to this invention is provided to improve the prior art in manners described below.

A. The control strategy according to this invention is fully implemented with a microprocessor and its software. In a digital system, a software algorithm and logical judgment is used to implement the control strategy, so the amendment of strategy and the adjustment of parameters are significantly more flexible than those in the aspect of analog control. Further, there are fewer components applied in the digital system and all signals are digitally processed, so the system is not easily interfered and is featured with high reliability.

Figure 5:
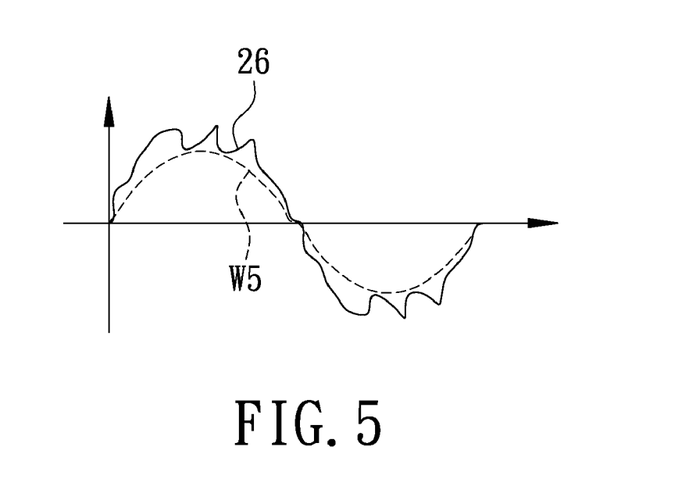
FIG. 5 is a view of a waveform generated when the input power voltage is a non-pure sine wave according to this invention.

B. In this invention, an external zero voltage crossover detection circuit is used to detect that a digital pulse signal is generated when the phase of rectification output voltage is 0 degree, and a high frequency signal of digital pulse is generated and inputted through the microprocessor by a built-in counter and a software program; next, the signal is used to look up a sine-wave table built in the microprocessor to generate a sine wave in 0 through 180 degree, serving as a basis upon which the input current waveform is calculated by software. In this invention compared with the prior art, the current command followed by the input power current detects the phase of input power voltage as a basis instead of the waveform. With cross reference to FIG. 5, when the voltage of input power 26 is not a pure sine wave, the current command W5 is still a sine wave, which may effectively solve the current waveform harmonics caused by the input voltage harmonics. Further, the manner of detecting the voltage waveform from the rectification output terminal may also reduce and simplify the length and calculation complexity of a sine wave table built in the microprocessor to increase the system reliability and reduce the cost. The voltage measurement may also simplify the circuit design, in which the microprocessor and the measurement circuit are directly connected for the DC output voltage as a common reference ground potential.

C. In order to solve the defects of dynamic response of prior art, a powerful controller design is provided in this invention to enhance the capability of system controlling the load disturbance in that when the DC output terminal is connected to a fast variation load, such as a motor driver, a required stable DC output voltage may be supplied. In this invention, an adequate transient compensation signal is obtained from the output load current through a properly designed high-pass filter to serve as an extra command added to the current loop for supplying the extra current compensating the load disturbance. When the disturbance ends, the transient compensation signal disappears automatically to make the system control re-function for normal adjustment of voltage loop parameters.

DETAILED DESCRIPTION OF THE PREFERRED EMBODIMENTS

Now, the present invention will be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 6:
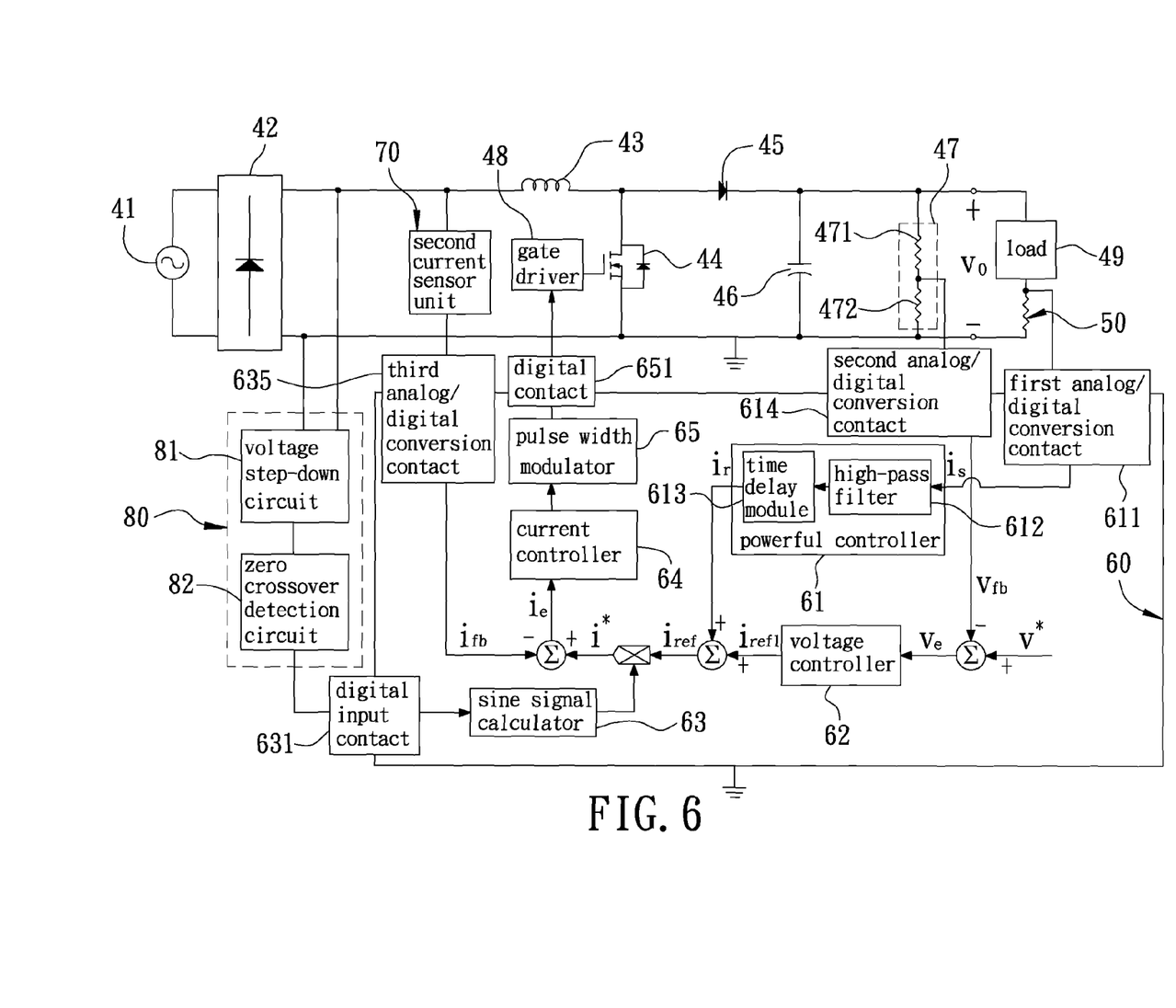
FIG. 6 is a schematic view illustrating a circuit in a preferred embodiment of this invention.

With reference to FIG. 6 shown as a schematic view illustrating a circuit in a preferred embodiment of this invention, the structure according to this invention is a booster-based AC-DC converter. The circuit comprises at least one input power 41, one rectifier 42, one power factor correction component 43, one power switch 44, one diode 45, one energy-saving component 46, one voltage sensor unit 47, and a gate driver 48. In the preferred embodiment of this invention, the rectifier 42 is a diode-based bridge rectifier, the power factor correction component 43 is a capacitor, and the voltage sensor unit 47 comprises two potential-divider resistors 471 and 472 that are connected in series. The components are same as those in the prior art and thus they are not described in detail herein.

Figure 7:
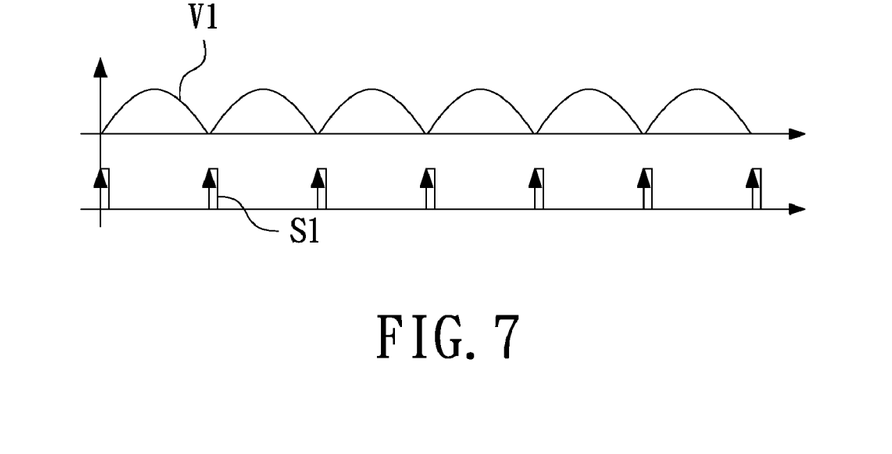
FIG. 7 is a view of a waveform generated by a voltage step-down circuit and a zero voltage crossover detection circuit.

With cross reference to FIG. 7 shown as a view of a waveform generated by a voltage step-down circuit and a zero voltage crossover detection circuit, for the requirements of this invention, the circuit further comprises a load 49, a first current sensor unit 50, a microprocessor 60, a second current sensor unit 70, and zero crossover detection unit 80. The load 49 is connected in series to the first current sensor unit 50 and further connected in parallel to the opposite terminals of potential-divider resistors 471 and 472. The opposite terminals of potential-divider resistors 471 and 472 define a DC output voltage Vo. In the preferred embodiment of this invention, the first current sensor unit 50 is a resistor or a Hall sensor component and is used to acquire current when the load 49 varies. Next, the microprocessor 60 is connected to the load 49, the voltage sensor unit 47, the gate driver 48, the second current sensor unit 70, and the zero crossover detection unit 80. The second current sensor unit 70 is next connected between the rectifier 42 and the power factor correction component 43. Further, zero crossover detection unit 80 comprises a voltage step-down circuit 81 and a zero crossover detection circuit 82. The voltage step-down circuit 81 is connected to the two terminals of rectifier 42 and then to the zero crossover detection circuit 82. The zero crossover detection circuit 82 is further connected to the microprocessor 60 so that the voltage step-down circuit 81 may be used to lower the voltage outputted by the rectifier 64 for acquiring a step-down voltage V1. The step-down voltage V1 matches with the voltage level of zero crossover detection circuit 82. The reference ground potential of zero crossover detection circuit 82 is identical to the potential of microprocessor 60. The zero crossover detection circuit 82 converts the voltage lowered by the voltage step-down circuit 81 into a pulse digital signal S1.

The microprocessor 60 further comprises a powerful controller 61, a voltage controller 62, a sine signal calculator 63, a current controller 64, and a pulse width modulator 65.

One terminal of the powerful controller 61 is connected through a first analog/digital conversion contact 611 between the load 49 and the first current sensor unit 50 so that the signal from the load 49 may be converted into a load current $i_s$ and then inputted to the powerful controller 61. The powerful controller 61 further comprises a properly designed high-pass filter 612 and a time delay module 613. One terminal of the high-pass filter 612 is connected to the first analog/digital conversion contact 611 to acquire the variation of load current $i_s$; the other terminal is connected to the time delay module 613, and thus a transient compensation signal $i_r$ is generated by the time delay module 613 to effectively increase the dynamic response of system and further enhance the DC output voltage Vo to suppress the disturbance of load 49. Besides, through a second analog/digital conversion contact 614, it is connected between the potential-divider resistors 471 and 472, a voltage measured from the potential-divider resistor 472 is sent to the second analog/digital conversion contact 614 and then converted into a DC feedback voltage $v_{fb}$, and the DC feedback voltage $v_{fb}$ is subtracted by a DC voltage command v* to obtain a voltage error volume $v_e$. The voltage error volume $v_e$ is further sent to the voltage controller 62 and calculated to obtain a current error compensation signal $i_{refl}$, and the current error compensation signal $i_{refl}$ is added to the transient compensation signal $i_r$ to obtain a current reference command $i_{ref}$. Next, a digital input contact 631 is connected between the zero crossover detection circuit 82 and the sine signal calculator 63 to obtain the pulse digital signal S1 converted by the zero crossover detection circuit 82. The pulse digital signal S1 is further inputted to the sine signal calculator 63.

Figure 8:
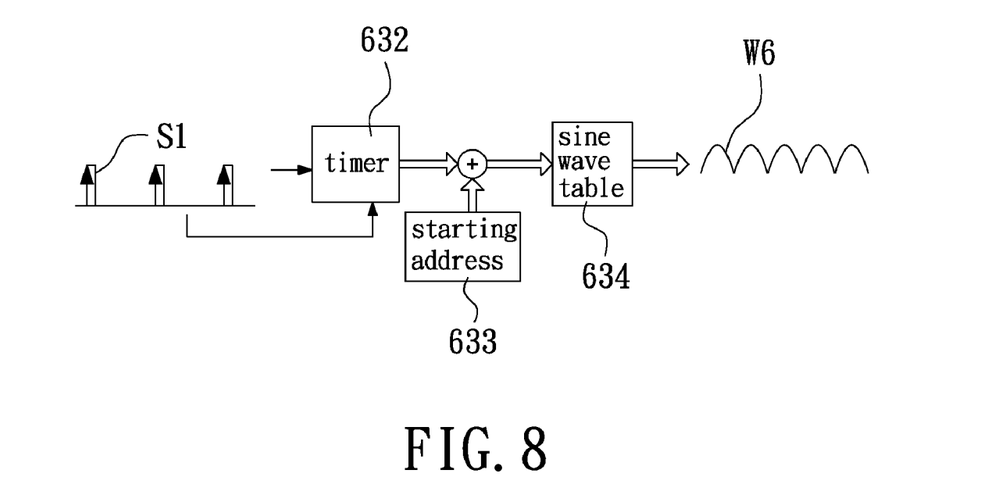
FIG. 8 is a schematic view illustrating a calculation flow of a sine signal calculator according to this invention.

With reference to FIG. 8 shown as a schematic view illustrating a calculation flow of a sine signal calculator according to this invention, the sine signal calculator 63 converts the pulse digital signal S1 through a timer 632 into an increment address data. The data is further added to a starting address 633 in a sine wave table to obtain a memory address of sine wave to be measured, and the memory address is used through a sine wave table 634 to acquire an input current waveform (sin θ)W6. The rising edge of pulse digital signal S1 resets the address data of timer 632 to zero to make the output of input current waveform W6 show a periodic output the frequency of which is same as that of pulse digital signal S1. Besides, in the sine wave table 634, the contents of input current waveform ranging from 0 degree to 180 degree are stored from a lower address of memory. Next, the input current waveform W6 is multiplied by the current reference command $i_{ref}$ to obtain a sine current command i*, and the amplitude of sine current command i* may be changed and adjusted according to the load 49. Further, the microprocessor 60 is connected through a third analog/digital conversion contact 635 to the second current sensor unit 70 to acquire a real input current $i_{fb}$. The real input current $l_{fb}$ is subtracted by the sine current command i* to obtain a current error volume $i_e$. For the current error volume $i_e$, a current error compensation signal $i_{refl}$ is acquired from the current controller 64, and then a pulse modulation signal is generated by the pulse width modulator 65 and converted into a drive signal from a digital contact 651 through the gate driver 48 to control the duty cycle of power switch 44. When the real input current $i_{fb}$ is higher than the sine current command i*, a negative value or a lower current differential compensation signal is obtained from the current controller 64 to lower the duty cycle; otherwise, the duty cycle increases. Thus, the real input current $i_{fb}$ stands for a minimum error volume may follow the sine current command i* to vary for achievement of the cophase voltage and current of input power 41 and thus increase of the power factor. In addition to the stable DC output voltage V0 that may be acquired, the phase of current of the input power 41 is made to further approach the voltage of input power 41 for achievement of the requirements of power factor that is 1.

Figure 9:
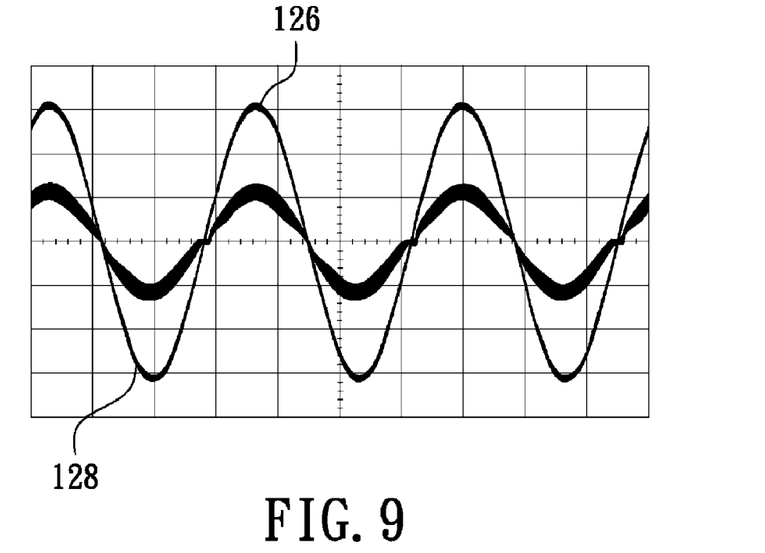
FIG. 9 is a view of a measured waveform illustrating the overload (400 W) of an AC input voltage 110V according to this invention.
Figure 10:
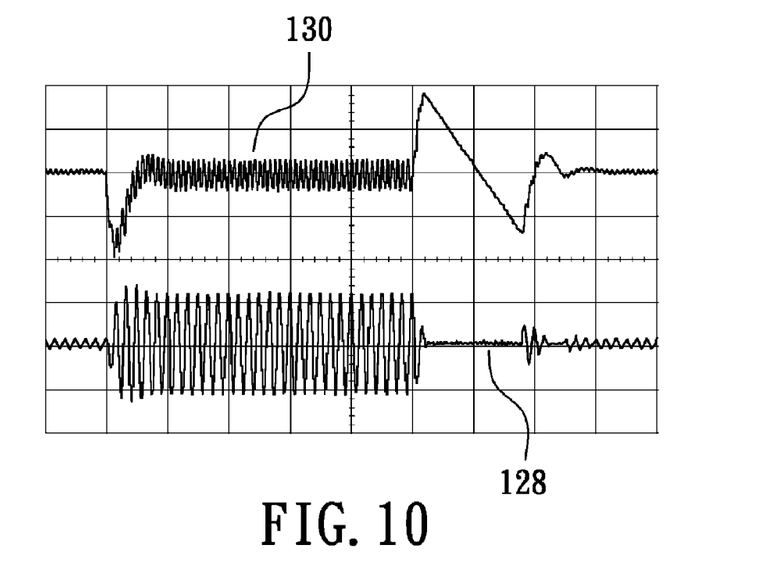
FIG. 10 is a view of a measured waveform illustrating the step load variation (rated load ranging from 10% to 100%) when a powerful controller is not added in this invention.
Figure 11:
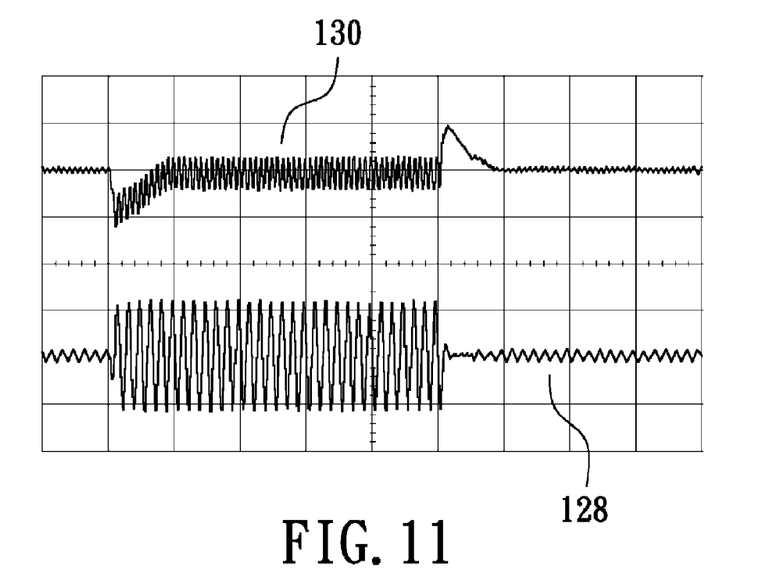
FIG. 11 is a view of a measured waveform illustrating the step load variation (rated load ranging from 10% to 100%) when a powerful controller is added in this invention.

With reference to FIG. 9 shown as a view of a measured waveform illustrating the full load (400 W) of an AC input voltage 110V according to this invention, when the AC voltage of input power 41 is 110V/60 Hz, the DC output voltage is Vo 200V, and the load 49 is full (400 W), the power factor may reach 0.997 that is obtained from the input voltage waveform 126 and input current waveform 128 measured from the input power 41.

with reference to FIGS. 10 and 11 respectively shown as a view of a measured waveform illustrating the step load variation (rated load ranging from 10% to 100%) when a powerful controller is not added in this invention, and a view of a measured waveform illustrating the step load variation (rated load ranging from 10% to 100%) when a powerful controller is added in this invention, it is apparent that when the powerful controller 61 is applied for a compensation strategy, the amplitude depth, overshoot, and setting time that are generated from the output voltage waveform 130 of DC output voltage V0 may be well improved, and the input current waveform 128 is then improved.

Figure 12:
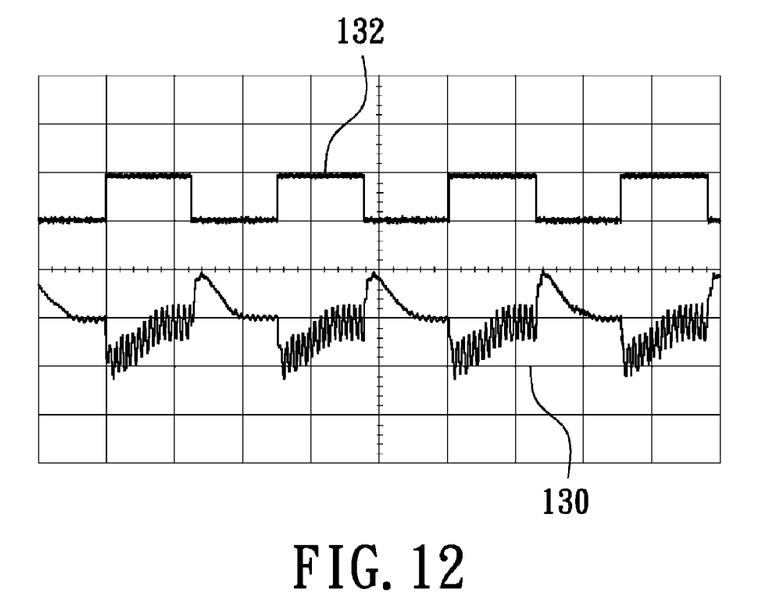
FIG. 12 is a view of a measured waveform illustrating the periodic (4 Hz) step load variation (rated load ranging from 10% to 100%) when a powerful controller is added in this invention.

With cross reference to FIG. 12 shown as a view of a measured waveform illustrating the periodic (4 Hz) step load variation (rated load ranging from 10% to 100%) when a powerful controller is added in this invention, it is apparent that the output voltage waveform 130 on a DC chain may be stable again; comparatively, from the AC power factor correction converter not provided with the powerful controller 61, in the same testing condition, the DC output voltage Vo is out of control and thereby a DC-chain output current waveform 132 is generated.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power factor correction converter capable of fast adjusting load, mainly comprising:
   an input power supplying an AC voltage;
   a rectifier connected to the input power and rectifying the input power to be a DC voltage;
   a power factor correction component connected to one terminal of the rectifier to keep or release the energy rectified by the rectifier;
   a power switch connected respectively to the rest of terminal of power factor correction component and rectifier;
   a diode one terminal of which is connected to the power factor correction component and the power switch to block the energy generated from the other side of input power from being charged to the rectifier and the power switch;
   an energy-saving component connected to the diode and the power switch, the two terminals of energy-saving component defining a DC output voltage;
   a voltage sensor unit connected in parallel to the energy-saving component and used to convert the DC output voltage into a signal of analog input level;
   a load one terminal of which is connected to one terminal of DC output voltage;
   a first current sensor unit one terminal of which is connected to the other terminal of load, and the other terminal of which is connected to the other terminal of DC output voltage to acquire a current when the load varies;
   a microprocessor in which a software program is installed, which is connected to the voltage sensor unit and one terminal of the load;
   a gate driver connected to the power switch and the microprocessor and used to convert a pulse modulation signal generated by the microprocessor to drive the power switch;
   a second current sensor unit one terminal of which is connected to one terminal of the rectifier, and the other terminal of which is connected to the microprocessor;
   a zero crossover detection unit comprises one terminal of which is connected in parallel to the rectifier and the other terminal is connected to the microprocessor, which is used to detect a zero voltage of the voltage outputted by the rectifier and generate a pulse signal synchronous with the zero voltage;
   the zero crossover detection unit comprises a voltage step-down circuit and a zero crossover detection circuit;
   one terminal of the voltage step-down circuit is connected to the rectifier and another terminal is connected to the zero crossover detection circuit; and
   the zero crossover detection circuit is further connected to the microprocessor, and the zero crossover detection circuit outputs a pulse synchronous with the zero voltage of input waveform of the input power.

2. The power factor correction converter capable of fast adjusting load according to claim 1, wherein a sine signal calculator is further provided in the microprocessor and receives a pulse signal generated by the zero crossover detection circuit, a sine wave table is provided in the sine wave signal calculator and thus inputted to a pulse waveform in the microprocessor by controlling the zero crossover detection circuit, a sine wave the phase of which is identical to that of input power is further generated, and the sine wave generated by the sine signal calculator ranges from 0 degree to 180 degree.

3. The power factor correction converter capable of fast adjusting load according to claim 1, wherein the first current sensor unit is a resistor.

4. The power factor correction converter capable of fast adjusting load according to claim 1, wherein the first current sensor unit is a Hall sensor component.

5. The power factor correction converter capable of fast adjusting load according to claim 1, wherein a powerful controller is further provided in the microprocessor and comprises a properly designed high-pass filter and a time delay module, one terminal of the high-pass filter is connected to the load and the other terminal is connected to the time delay module, and thus a transient compensation signal acquired by the powerful controller is used to increase the dynamic response of system and further enhance the DC output voltage to suppress the disturbance of load.

6. The power factor correction converter capable of fast adjusting load according to claim 5, wherein a transient compensation signal given by the powerful controller is calculated with a current error compensation signal given by a voltage controller connected to the voltage sensor unit after calculation and subtracted by a real input current obtained from the second current sensor unit to acquire a current error volume, and the current error volume passes through the current controller and the pulse width modulator to drive the gate driver and thus control the power switch.

7. The power factor correction converter capable of fast adjusting load according to claim 1, wherein the power factor correction converter is an inductor.

8. The power factor correction converter capable of fast adjusting load according to claim 1, wherein the voltage sensor unit further comprises two potential-divider resistors connected in series, and the microprocessor is further connected between the potential-divider resistors.

9. A power factor correction converter capable of fast adjusting load, mainly comprising:
   an input power supplying an AC voltage;
   a rectifier connected to the input power and rectifying the input power to be a DC voltage;
   a power factor correction component connected to one terminal of the rectifier to keep or release the energy rectified by the rectifier;
   a power switch connected respectively to the rest of terminal of power factor correction component and rectifier;
   a diode one terminal of which is connected to the power factor correction component and the power switch to block the energy generated from the other side of input power from being charged to the rectifier and the power switch;
   an energy-saving component connected to the diode and the power switch, the two terminals of energy-saving component defining a DC output voltage;
   a voltage sensor unit connected in parallel to the energy-saving component and used to convert the DC output voltage into a signal of analog input level;
   a load one terminal of which is connected to one terminal of DC output voltage;
   a first current sensor unit one terminal of which is connected to the other terminal of load, and the other terminal of which is connected to the other terminal of DC output voltage to acquire a current when the load varies;
   a microprocessor in which a software program is installed, which is connected to the voltage sensor unit and one terminal of the load;

a gate driver connected to the power switch and the microprocessor and used to convert a pulse modulation signal generated by the microprocessor to drive the power switch;

a second current sensor unit one terminal of which is connected to one terminal of the rectifier, and the other terminal of which is connected to the microprocessor;

a zero crossover detection unit one terminal of which is connected in parallel to the rectifier and the other terminal is connected to the microprocessor, which is used to detect a zero voltage of the voltage outputted by the rectifier and generate a pulse signal synchronous with the zero voltage;

a powerful controller is provided in the microprocessor and comprises a properly designed high-pass filter and a time delay module; and one terminal of the high-pass filter is connected to the load and another terminal is connected to the time delay module, and thus a transient compensation signal acquired by the powerful controller is used to increase the dynamic response of system and further enhance the DC output voltage to suppress the disturbance of load.

10. The power factor correction converter capable of fast adjusting load according to claim 9, wherein zero crossover detection unit comprises a voltage step-down circuit and a zero crossover detection circuit, one terminal of the voltage step-down circuit is connected to the rectifier and the other terminal is connected to the zero crossover detection circuit, the zero crossover detection circuit is further connected to the microprocessor, and the zero crossover detection circuit outputs a pulse synchronous with the zero voltage of input waveform of the input power.

11. The power factor correction converter capable of fast adjusting load according to claim 10, wherein a sine signal calculator is further provided in the microprocessor and receives a pulse signal generated by the zero crossover detection circuit, a sine wave table is provided in the sine wave signal calculator and thus inputted to a pulse waveform in the microprocessor by controlling the zero crossover detection circuit, a sine wave the phase of which is identical to that of input power is further generated, and the sine wave generated by the sine signal calculator ranges from 0 degree to 180 degree.

12. The power factor correction converter capable of fast adjusting load according to claim 9, wherein the first current sensor unit is a resistor.

13. The power factor correction converter capable of fast adjusting load according to claim 9, wherein the first current sensor unit is a Hall sensor component.

14. The power factor correction converter capable of fast adjusting load according to claim 9, wherein a transient compensation signal given by the powerful controller is calculated with a current error compensation signal given by a voltage controller connected to the voltage sensor unit after calculation and subtracted by a real input current obtained from the second current sensor unit to acquire a current error volume, and the current error volume passes through the current controller and the pulse width modulator to drive the gate driver and thus control the power switch.

15. The power factor correction converter capable of fast adjusting load according to claim 9, wherein the power factor correction converter is an inductor.

16. The power factor correction converter capable of fast adjusting load according to claim 9, wherein the voltage sensor unit further comprises two potential-divider resistors connected in series, and the microprocessor is further connected between the potential-divider resistors.

* * * * *